United States Patent [19]
Luiz

[11] 3,776,196
[45] Dec. 4, 1973

[54] CLAW ASSEMBLY FOR MILKING MACHINES

[76] Inventor: Joseph W. Luiz, 5482 Bodega Ave., Petaluna, Calif. 94952

[22] Filed: Apr. 19, 1972

[21] Appl. No.: 245,372

[52] U.S. Cl.......... 119/14.36, 119/14.39, 119/14.54
[51] Int. Cl. ............................................ A01j 05/16
[58] Field of Search...................... 119/14.36, 14.46, 119/14.39, 14.4, 14.37, 14.55, 14.54, 14.11, 14.12

[56] References Cited
UNITED STATES PATENTS

| | | | |
|---|---|---|---|
| 2,518,589 | 8/1950 | Anderson........................ | 119/14.54 |
| 2,893,350 | 7/1959 | Bouma............................ | 119/14.12 |
| 2,404,069 | 7/1946 | Hinman .......................... | 119/14.4 |
| 2,775,225 | 12/1956 | Brown et al. .................... | 119/14.54 |
| 1,384,266 | 7/1921 | Maes............................... | 119/14.37 |
| 1,261,780 | 4/1918 | Dinesen ....................... | 119/14.55 X |
| 2,902,975 | 9/1959 | Babson ....................... | 119/14.46 X |
| 2,727,491 | 12/1955 | Reeve .............................. | 119/14.54 |

FOREIGN PATENTS OR APPLICATIONS

| | | | |
|---|---|---|---|
| 261,288 | 4/1968 | Austria........................... | 119/14.56 |
| 121,096 | 3/1946 | Australia......................... | 119/14.55 |

Primary Examiner—Robert Peshock
Assistant Examiner—James H. Czerwonky
Attorney—Robert Charles Hill

[57] ABSTRACT

A claw assembly for a milking machine has a tubular shaped milk receiving member provided with two pair of milk stems spatially arranged to project upwardly and outwardly therefrom and a milk outlet located on the bottom surface of the rear portion thereof. The length of the milk outlet is substantially less than that of the receiving member. The location of the milk outlet in combination with the location and spacing of the milk stems provides a unique claw structure whereby during a milking operation greater weight is applied to the rear portion of the milk receiving member than to the front portion of said member resulting in faster milking with less chance of injury to the sensitive portions of a milk cow. This claw assembly enables the front and rear quarters of the cow's udder to be drained in substantially the same length of time.

8 Claims, 4 Drawing Figures

PATENTED DEC 4 1973

3,776,196

3,776,196

CLAW ASSEMBLY FOR MILKING MACHINES

BACKGROUND OF THE INVENTION

This invention relates generally to milking machines and more particularly to a claw assembly for a milking machine of the vacuum pulsator type.

The anatomy of the udder of a milk cow is such that a larger quantity of milk is contained in the rear quarters than in the front quarters. In fact, approximately 60 percent of the milk is contained in the rear quarters and only 40 percent in the front quarters.

However, the construction of prior art milk claw assemblies is such that during the milking operation the greatest weight is applied to the cow teats associated with the front quarters of the cow udder rather than the teats associated with the rear quarters of the udder. The result is an uneven milking operation wherein the front quarters of the udder are emptied long prior to the complete removal of milk from the rear quarters. Consequently, the sensitive portions of the cow teats and udder associated with the front quarters thereof are irritated and often substantially injured.

For instance, the constant application of vacuum to the front quarters after the milk has been withdrawn therefrom tends to draw the fluids of the mammary system from the udder to the surfaces of the teat, and hampers the blood circulation. In many instances, the cow's teats may become purplish blue in color due to the amount of blood which has been drawn into the lower end by the constant vacuum applied thereto. Also, fluids are actually drawn through the skin to the outer surface of the teats resulting in an obviously undesired condition. In addition, the constant contraction and release of the cow's teats, especially after all the milk has been withdrawn therefrom, tends to irritate them and causes rapid breakdown of the tissues. The end result of this has been a tremendous increase in the amount of mastitis which has attacked the dairy herds of this country and is one of the main problems of the dairy industry.

Moreover, in prior art milk claw assemblies the milk outlet which connects to the milk hose leading to the milk container has always been located near the front portion of the milk claw. As a result, pulling on the milk hose in an attempt to equalize the rate of flow between the front and rear quarters of the udder only succeeds in applying even greater weight to the front quarters and shifts the entire claw assembly forwardly causing still further irritation and injury to the cow teats, etc., and also leads to poor milking results since among other things it lowers the rate of milk flow through the teat canals.

The milk claw assembly of the present invention is constructed so as to eliminate all of the aforementioned defects associated with prior art devices. The construction of the present milk claw assembly causes the assembly to balance naturally with the bottom of the cow udder. That is, the construction of the milk claw of the present invention results in the milk claw staying in proper alignment with the cow udder.

One of the primary objects of the present invention is the provision of a milk claw construction which applies greater weight to the rear quarters of the cow udder than to the front quarters thereof with the result that an even milking operation is accomplished whereby the front and rear quarters of the udder are drained of milk at approximately the same time as opposed to prior art devices wherein the front quarters were drained far in advance of the rear quarters.

A further object of the invention is the provision of a novel milk claw assembly construction whereby the milk outlet is located on the bottom surface of the rear portion thereof whereby the application of a pulling force to the milk outlet tends to apply greater weight to the rear quarters of the cow udder rather than the front quarters thereof.

A still further object of the invention is the provision of a milk claw assembly whereby the milk will flow evenly and smoothly through the claw assembly without excessive agitation or turbulence and which reduces the quality of the milk produced.

Yet another object of the invention is to provide a milk claw assembly of substantially unitary construction and which also permits all of the milk carrying passages therein to be readily accessible for cleaning and inspection purposes.

A further object of the invention is the provision of a milk claw assembly wherein the milk stem portions are of a unique design and situated thereon at locations which accommodate a great variety of udder shapes and sizes including the widely shaped udders which prevent the simultaneous milking of all teats with prior art milk claw devices.

Other and further objects and advantages of the present invention will be apparent from the following description and claims and are illustraed in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE PREFERRED EMBODIMENT

Figure 1:
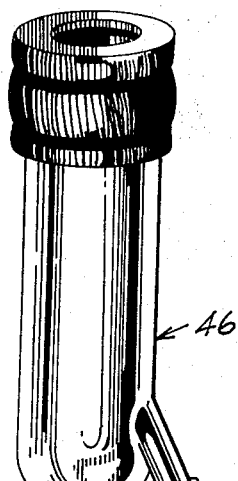
FIG. 1 is a perspective of the milk claw assembly of the present invention shown in assembled relation with a teat cup therefor.

Referring now to the drawings the milking claw of the present invention comprises a milk receiving member 10 having a tubular body member 12. Located on the upper side of the tubular body member 12 is an air carrying unit 14 having a tubular body member 16 of shorter length than the body member 12. The assembly is adapted for use with a milker machine of the pulsator type.

The end 18 of the body member 16 has an air conduit 20 attachable with a pulsator apparatus (not shown) of the milking machine, which apparatus functions in a well known manner to deliver air at alternately high and low pressures to the conduit 20.

The body member 12 is provided with milk stems 22 which are preferably formed integrally with the body member. The milk stems 22 are arranged in a longitudinally spaced relation and in pairs, with the milk stems in each pair arranged oppositely from each other and extending upwardly and outwardly from the body member 12. The inner ends of the milk stems 22 are in fluid communication with the space within the tubular body member 12.

Figure 2:
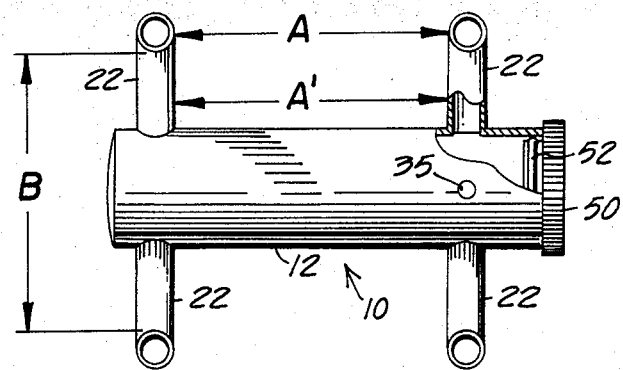
FIG. 2 is a top plan view of the milk claw assembly of the present invention.
Figure 3:
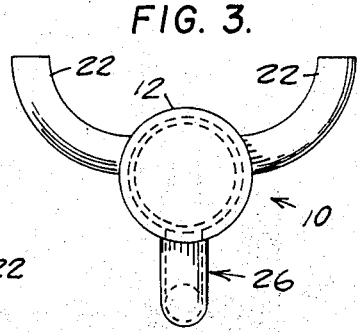
FIG. 3 is an end view of the milk claw assembly of the present invention.

FIGS. 2 and 3 depict a preferred embodiment of the invention and illustrate certain desired features of the milk stems 22. One desired feature is the equidistant spacing between the termini of adjacent milk stems. This is illustrated in FIG. 2 wherein the dimension denoted as A is equal to the dimension denoted as B. In actual practice it has been found that the best results are obtained when the equal dimensions A and B are between 3 and 5 inches and excellent results have been obtained when the dimensions A and B are equal to 4¼ inches. It is also important, for purposes of milk claw stabilization with respect to the cow udder, that the distance A' between the juncture of the forward and rearward milk stems be equal to the distance A.

As best shown in FIG. 3, it has also been found that it is preferable for the milk stems to be formed in a generally U-shaped configuration with respect to a plane which is perpendicular to the longitudinal axis of the body member 12. Both the equidistant spacing feature and U-shaped configuration of the milk stems give superior results from the standpoint of smooth milk flow and also with respect to facilitating use of the claw assembly on cows having a great variety of udder shapes and sizes including what is known as "wide span" udders.

Returning now to the air carrying unit 14, it should be noted that the body member 16 is provided with oppositely arranged pairs of air tubes 40, which are arranged in a common plane and extend laterally in opposite directions from the body member 16. In a milking operation, air lines 42 and milk lines 44, forming a part of inflation type teat cup assemblies 46 (one of which is illustrated in FIG. 1) are connected, respectively, with the air tubes 40 and the milk stems 22. Thus, as is readily understood by those skilled in the art, the alternately high and low air pressure delivery via the air tubes 40 to the teat cups 46 serves to draw milk through the milk lines 44 and milk stems 22 into the chamber of the milk receiving body member 12.

Figure 4:
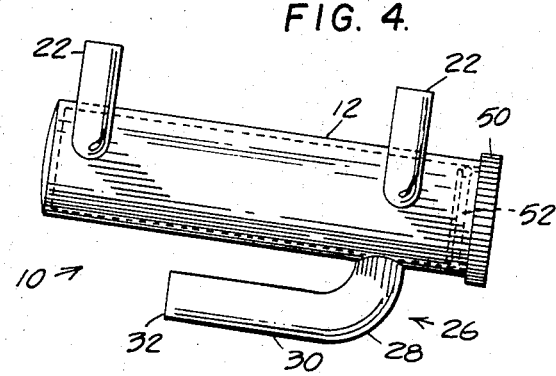
FIG. 4 is a side view of the milk claw assembly of the present invention.

A primary feature of the invention is the location of the milk outlet conduit 26 on the milk receiving member 10 As best shown in FIG. 1, taken in conjunction with FIG. 4, the milk outlet conduit is located at the rear end portion of the body member 12 and on the bottom side thereof, preferably below the juncture of the rear stems 22 with the body member 12. Preferably the outlet conduit 26 is formed with a gentle bend as shown at 28 a short distance after emanating from the body member 12 such that the major portion of the outlet conduit runs parallel to the longitudinal axis of the body member as shown at 30.

The outer end 32 of the milk outlet conduit 26 is attached to a milk hose 34 which hose is connectible with a milk receptacle (not shown) which receptacle is maintained under a sub-atmospheric pressure in the operation of the machine. A vent hole 35 is located on top of the body member 12, preferably in the location shown in FIG. 1 in order to provide flow through the vacuum created in the milk hose 34.

In actual operation the milk hose 34 is generally under a slight amount of tension and this results in a pulling force or weight factor being applied to the milk receiving member 10 at the location of joinder between the milk outlet 26 and the body member 12. Consequently, the entire milk receiving member 10 slopes slightly downwardly from front end to rear end or from left to right as viewed, for example, in FIG. 4.

This feature of the invention is important for several reasons. Firstly, the additional weight factor on the rearward end of the body member 12 applies greater weight to the rear quarters of the cow udder. This tends to drain the rear quarters of the udder more rapidly than the front quarters which is desirable since approximately 60 percent of the milk is contained in the rear quarters and as a consequence both front and rear quarters become empty at substantially the same point in time. This uniform milking time between front and rear quarters is very beneficial because it minimizes the chance of irritation or injury to the sensitive cow teats and udder due to premature emptying of either the front or rear quarters. Due to the location of the milk outlet 26 on the body member 12 it is possible to alter the rate of milk removal from either the front or rear quarters by increasing or decreasing the tension in the milk hose 34. Thus, decreasing the tension in hose 34 tends to apply relatively less weight to the rear quarters while increasing the tension in hose 34 tends to apply greater weight to the rear quarters with a concomitant decrease or increase in the rate of milk flow therefrom.

In addition, the gentle slope of the body member 12 downwardly from front to rear during a milking operation results in an even and smooth flow through the outlet 26 and minimizes the possible formation of agitation pools of milk within the body member 12 which reduce the quality of milk produced.

A further feature of the invention resides in the provision of a removable fluid tight sealing member at one end of the body member 12. As best shown in FIGS. 2 and 4 a removable closure member 50 is illustrated in fluid tight engagement with the rear end portion of body member 12. It should be understood that the closure member could also be located at the forward end of body member 12 rather than the rear end or, if desired, such closure members could be applied at both ends. Although any of a variety of fluid tight connections could be utilized between the body member 12 and the closure member 50 (such, for example, as a threaded connection), it has been found preferable to employ the use of an O-ring seal 52 as shown. Preferably, the O-ring is positioned in a groove formed in the closure 50 but it could, of course, be placed in a groove formed internally of the body member 12. On removal of the sealing closure 50 complete accessibility is given to the body member 12 and the milk stems 22 so that quick and efficient cleaning and sanitizing may be accomplished.

While I have illustrated and described preferred embodiments of my invention, it is to be understood that these are capable of variation and modification, and I therefore do not wish to be limited to the precise details set forth, but desire to avail myself of such changes and alterations as fall within the purview of the following claims:

What I claim is:

1. A claw assembly for a milking machine comprising:

a. a milk receiving member of tubular shape and having a forward end portion and a rear end portion;
b. two pairs of upwardly and outwardly extending milk stems mounted in a spaced relation longitudinally along said milk receiving member and being in communication therewith
c. milk outlet means emanating from the rear end portion of the milk receiving member and mounted on the bottom side thereof, said outlet means extending forwardly along the axis of said receiving member, the length of said outlet means being substantially less than that of said receiving member, said milk outlet means connectible with a milk hose leading to a milk container, said receiving member having more weight at its rear end than at its front end, the location of said milk outlet means permitting the application of greater weight to the rear end portion of the milk receiving member and also the application of a pulling force to the milk hose tending to apply even greater weight on the rear end portion of the milk receiving member as compared with the front end portion of said member whereby the front and rear quarters of a cow udder are drained in substantially the same length of time;
d. and removable means for fluid sealing one end of said milk receiving member.

2. A claw assembly for a milking machine as set forth in claim 1 and further comprising an air carrying member of tubular shape secured to the upper portion of said milk receiving member at a location between an adjacent pair of said milk stems; said air member having a closed one end and connectible at its other end with a pulsator mechanism; said air member further having pairs of air tubes corresponding to said pairs of milk stems and arranged in a spaced relation longitudinally of the air member.

3. A claw assembly for a milking machine as set forth in claim 1 wherein the longitudinal distance between both ends of the milk stem pairs is equal and between three and five inches.

4. A claw assembly for a milking machine as set forth in claim 1 wherein the outer termini of adjacent milk stems are located substantially equidistant from each other.

5. A claw assembly for a milking machine as set forth in claim 3 wherein each pair of milk stems forms a generally U-shaped configuration when viewed endwise along the longitudinal axis of said milk receiving member.

6. A claw assembly for a milking machine as set forth in claim 1 wherein said removable fluid sealing means is located at the rear end of said milk receiving member.

7. A claw assembly for a milking machine as set forth in claim 1 wherein the milk receiving member is provided with a relatively small air vent aperture on the upper side of the rearward end thereof.

8. A claw assembly for a milking machine as set forth in claim 1 wherein a major portion of said milk outlet means extends parallel to the longitudinal axis of the milk receiving member.

* * * * *